United States Patent [19]

Roe et al.

[11] 4,217,577

[45] Aug. 12, 1980

[54] CHARACTER GRAPHICS COLOR DISPLAY SYSTEM

[75] Inventors: David Roe, Romsey; Brian R. Sowter, Winchester, both of England

[73] Assignee: International Business Machines Corporation, Armonk, N.Y.

[21] Appl. No.: 968,334

[22] Filed: Dec. 11, 1978

[30] Foreign Application Priority Data

Dec. 9, 1977 [GB] United Kingdom ............... 51441/77

[51] Int. Cl.[2] ............................................ G06K 15/20

[52] U.S. Cl. .................................... 340/703; 340/750; 340/799; 340/801

[58] Field of Search ............... 340/703, 750, 801, 799, 340/701

[56] References Cited

U.S. PATENT DOCUMENTS

| | | | |
|---|---|---|---|
| 3,771,155 | 11/1973 | Hayashi et al. | 340/703 |
| 3,854,130 | 12/1974 | Ligocki | 340/703 |
| 3,944,999 | 3/1976 | Moore | 340/703 |
| 4,101,879 | 7/1978 | Kawaji et al. | 340/703 X |

*Primary Examiner*—David L. Trafton
*Attorney, Agent, or Firm*—Frederick D. Poag

[57] ABSTRACT

Mixed color effects in a character graphics display system are achieved by providing font characters comprising several character cells with different patterns which can selectively be read simultaneously to different color registers, thereby determining the color in which each character cell is to be displayed. The system also provides characters comprising only a single character cell which can selectively be directed to any of the color registers. A control system interprets color bits in a control word in accordance with the type of character being accessed.

4 Claims, 5 Drawing Figures

CHARACTER GRAPHICS COLOR DISPLAY SYSTEM

FIELD OF THE INVENTION

This invention relates to a character graphics color display system.

BACKGROUND OF THE INVENTION

A simple form of display system is a character display system, in which only a font of alphanumeric characters is available to the user who can thereby choose to display textual and numeric information. An example of such a display system is the IBM (Trademark) 3270. At the other extreme is the display system, such as the IBM 2250, which can be programmed to display, not only alphanumeric information, but also extremely complex line figures useful in computer aided design. The advantage given by the flexibility of the latter system is often more than counterbalanced by the sophisticated programming required, which is beyond the resources of many potential users. Further, many users do not require all the facilities available and a more limited display system may be more suited to their needs. Such a system is provided by character graphics. In an alphanumeric display, it is usual to allot a fixed area of the display field to each character. We call such an area an image cell. In a relatively low capacity display system, there are twenty rows each of forty-eight image cells, giving a total capacity of nine hundred and sixty characters. A font of characters is held in a store and is selectively accessed to generate the display image. Character graphics is an extension of this technique whereby the font available to the user includes not only letters, numbers and typographic signs, but also line segments arranged at various angles, shading and other elements enabling the user to generate simple geometric or mathematical designs, such as graphs, histograms or outline maps, by arranging elements of the font side by side on the screen. We call each element of the font a character.

The display device most frequently used is a cathode ray tube but it is to be understood that other display devices, for example, liquid crystals, electroluminescent or electrochromic materials, or light-emitting diodes, can be employed. Although character graphics can be implemented on any type of display device presenting a suitable display area to the user, in this specification the system to be described by way of example uses a cathode ray tube. The display area will be called the screen.

In a monochrome display the cathode ray beam is caused to trace a raster of closely-spaced parallel lines on the screen. In response to video information consisting of a sequence of binary digits the intensity of the beam is modulated to produce a pattern of visible dots which make up the required display. The dots correspond to the discrete display elements of the matrix displays mentioned above. Video information is generated line by line in synchronism with the raster traced by the cathode ray beam by selecting the required characters from the font which is stored in a character buffer. Each character consists of an array of binary digits, for example, nine bits wide by twelve bits high. The arrangement of one bit within the cell defines the pattern of the character represented by the display cell. Since the character extends over a plurality of lines of the raster—in the example, twelve lines—it is necessary to copy out the character line by line in synchronism with the raster scan. Any of several well-established arrangements can be used to achieve this, of which the most common is to use a raster line counter in accessing the character store so that only the line of the character belonging to the line of video information being assembled is copied from the store. In certain models of the IBM 3270 display system (e.g. the IBM 3277 Display Station), a line buffer is used into which the characters forming a row of text are copied. The line buffer is a circulating shift register and from it the binary information forming the video information for each raster line is read.

A monochrome character graphics system is disclosed in U.S. Pat. No. 3,891,982 to Cheek et al. Although the image is constructed of image cells and a font of alphanumeric characters is provided, graphic symbols are built up as required by a decoding sequence of code words each defining a single vector. More than one code word is necessary when an image cell is to include a plurality of vectors and provision is made to accumulate and superimpose the newly generated vectors before supplying video information to the display device. It will be seen that, besides providing a color character graphic system, our invention is a considerable simplification over this Patent, which may, however, be taken as exemplifying, in its procedures for handling alphanumeric characters, a typical state of the art system.

The provision of color in an information display system requires much more data to be associated with each display position than one binary digit, since besides defining whether the cathode ray beam is to be brightened at a given position in the raster, the color of the spot must be defined. Since color is defined with reference to three primary colors, it is usual to use three bits to define a limited number of color combinations of the primaries to provide what has been found to be an adequate choice of colors for most display purposes. How the color is generated on the display forms no part of this invention which is concerned with the supply of color video information to the display device in an economical manner. Character graphics reduces the amount of color information required since the information relates to a whole image cell rather than to a single display position on the screen. But simply to nominate a single color for an image cell leads to an undesirable lack of flexibility and leads to problems when, for example, lines cross or when special effects such as colored backgrounds are required.

It is the aim of this invention to provide a simple and cheaply implementable means of achieving mixed color effects in a single image cell.

The line-crossing problem has been tackled in U.S. Pat. No. 4,016,544 to Morita et al, although not specifically in relation to color character graphics. The video signal is supplied selectively to three color registers, respectively red, green and blue information memories. The memories are read simultaneously to a display device. A one bit in a memory causes the corresponding primary color to be displayed. One bit in more than one memory causes a combination of the primary colors to produce a secondary color. The patent describes the problem involved in line crossing when colors are associated with graphic elements such as lines. If a red line is drawn and later a green line is drawn to cross the red line, with the system described in the patent as prior art, the crossing point of the red line is erased. According to the patent, the problem is solved by providing mask bits which allow the contents of the color registers to be changed only when the mask bit is a given value. The patent thus provides a form of data protection to permit a choice of whether, in the example given, the bit in the red information register representing the crossing point is to be changed thus permitting red or green or a combination of red and green is to be displayed at the crossing point. The patent requires for each display position or group of eight display positions, a mask bit for each color information register.

SUMMARY OF THE INVENTION

Our invention proposes a simpler and more generally applicable means of controlling mixed color effects within a single image cell.

According to the invention a color character graphic display system, includes a display device by means of which a colored image consisting of image cells is displayed, character buffer means arranged in operation to store a set of different characters, each consisting of more than one character video cell, image buffer means arranged in operation to store information defining the image to be displayed, a plurality of color registers each arranged in operation to store video information relating to a different primary color, and control means operative in response to information read from the image buffer means to generate the video information for an image cell by copying from the character buffer the character video cells of which a selected character consists simultaneously to the color registers.

A character video cell is a pattern of binary digits which control the drive circuitry of a display device to provide a display extending over an image cell.

In the preferred embodiment of the invention there are three color registers, associated respectively with primary colors red, green and blue. Although white is not strictly a primary color, it is convenient to treat it as such when only a limited range of colors are required. The term primary color should therefore be understood as meaning any color which is selected as a basic component belonging to a group of such components which may be combined to provide the range of colors available to the display. The image buffer means contains coded information for each image cell making up the required image. The information includes the address in the character buffer at which a required character is stored and three color bits. If a selected character has only a single video cell, the color bits are interpreted as defining one of eight possible colors and cause the video cell to be copied into the color registers appropriate to the selected color. If the selected character has more than one video cell, the color bits are interpreted as mask bits determining which of the video cells are copied from the character buffer.

In U.S. Pat. No. 4,016,544, mentioned above, the information in the color registers is selectively modified in the case of line-crossing. Our invention relies on choosing the information to be copied to the color registers, and is more generally applicable than merely to solving the line-crossing problem.

BRIEF DESCRIPTION OF THE DRAWINGS

The invention will now be further explained, by way of example, with reference to the accompanying drawings, in which.

DETAILED DESCRIPTION

Figure 1:
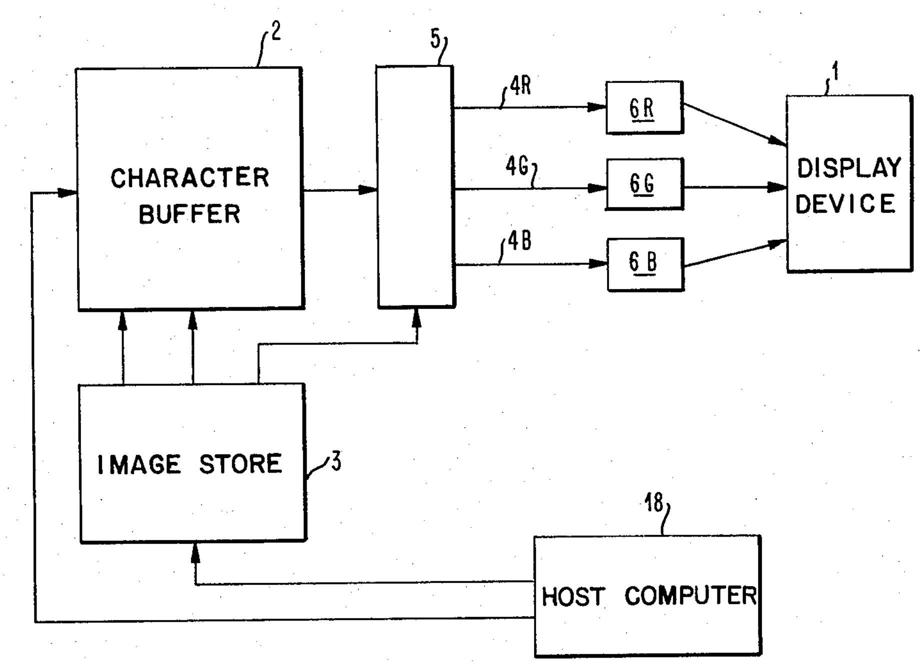
FIG. 1 is a schematic block diagram of a color character graphic display system according to the invention.

Referring to FIG. 1, a color display device 1 is such that an image is displayed by modulating or generating light at selected display positions which, in the preferred embodiment, are positions along a cathode ray tube (CRT) raster. In order to generate the required display all that is needed is a sequence of color video information, synchronized with the raster scan, defining the color to be displayed at each display position of the raster. The invention is concerned with the generation of color video information.

The information is derived from a character buffer 2 which stores, in the form of character video cells, a font of graphic and alphanumeric character cells. Selected character video cells are copied serially from the character buffer 2, in accordance with coded information read from an image store 3, and are directed to the color channels 4R, 4G and 4B, by control equipment 5 which also operates in response to coded information from the image store 3. Each color channel contains a register, respectively 6R, 6G and 6B, so that the information in the channel can be synchronized with operation of the display device. The color video information thus consists of sequences of binary digits representing the presence or absence of a given color in accordance with the color channel in which they are found. If the display device is a CRT, the image store 3 is refresh storage which, in known manner, makes available to the character buffer 2 coded information representing an image each time the image is traced on the CRT screen. If, however, the display device 1 is a device, such as a gas panel, which has memory, coded information need only be read from the image store 3 when the displayed image is changed. How the color video information is used to generate the required image is not part of the invention and will not be described in detail, but in the case of the shadowmask color TV tube, the signals in the respective channels are used respectively to control the operation of the red, green and blue guns.

Figure 2:
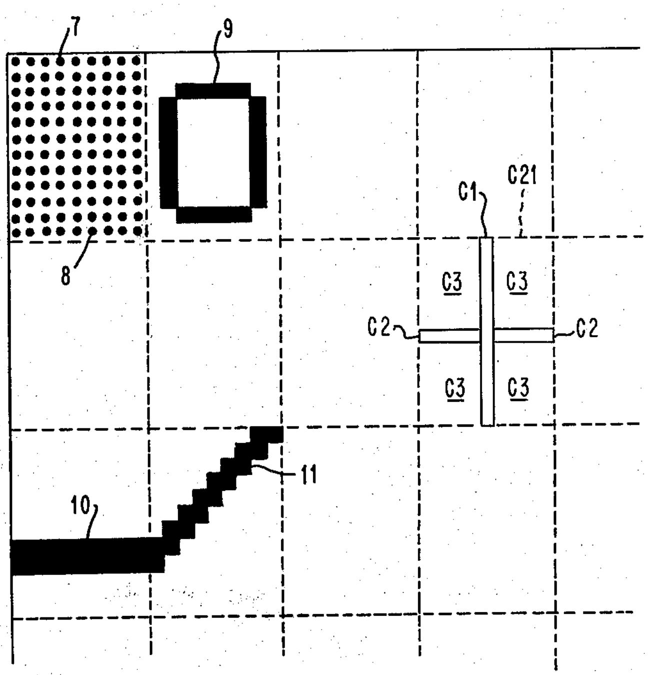
FIG. 2 is illustrative of a character graphics font.

FIG. 2 of the drawings shows how an image is constructed in a character graphics system. The display area, which is bounded in FIG. 2 by the unbroken lines, contains a large number of display positions 7 arranged in rows and columns. In a CRT each display position 7 normally contains one or more red, green and blue phosphor triads. Groups of display positions 7 form an image cell 8, which in the preferred embodiment, and as shown in FIG. 2, is nine display positions 7 wide and twelve display positions 7 high. For clarity only the display positions 7 of one image cell are shown in FIG. 2. A selected image is generated by selecting from the font held in character buffer 2 an appropriate character consisting of one or more character video cells for at least some of the image cells and by leaving the remaining image cells blank. A character video cell consists of as many binary digits as there are display positions in an image cell. If a display position is to be activated, the corresponding binary digit is a one, otherwise it is zero. Reference 9 of FIG. 2 indicates a typical alphanumeric character of the font. References 10 and 11 of FIG. 2 show typical graphics members of the font.

It will be necessary in certain applications to display in the same image cell lines of different colors. It will also be desirable to provide other mixed color effects such as to high light graphic or alphanumeric characters by displaying them against a contrastingly colored background, rather than against whatever color is chosen as the background of the whole screen.

Figure 3:
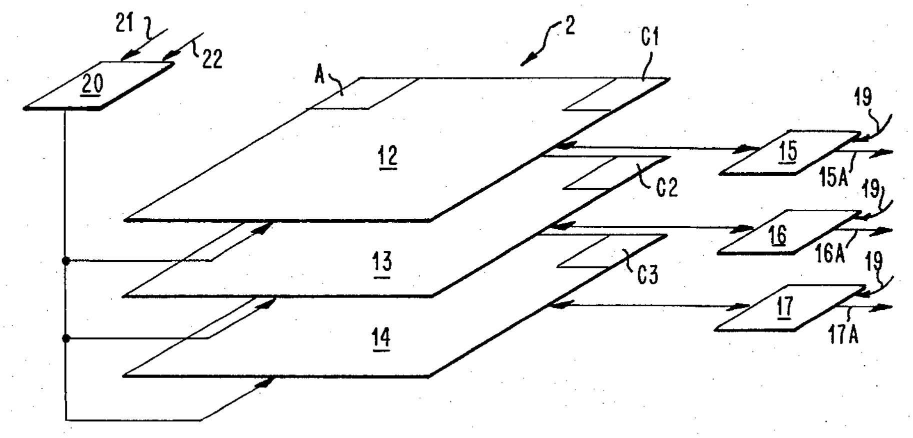
FIG. 3 shows schematically a character buffer suitable for use in one embodiment of a system according to the invention.

FIG. 3 shows schematically a preferred embodiment of character buffer 2 which, in conjunction with the control equipment 5, enables such mixed color or character effects to be readily achieved. The buffer is comprised of conventional components such as high density semiconductor circuits or magnetic cores, but is characterized by having three separately addressable sections 12, 13, 14. Each section can have a respective input/output register 15, 16, 17, but this is not essential, as a single register can be time multiplexed between the three sections. Each register 15, 16 or 17 can receive data from its respective section of the buffer store or from a host computer 18 (FIG. 1) by way of conductors 19. Data is transmitted from each register to the control equipment 5 by way of conductors 15A, 16A and 17A. Conventional address circuitry 20 receiving data either from the image store 3 over conductor 21 or the host computer 18 over conductor 22 operates to address the storage sections as required. FIG. 3 is schematic and it is to be understood that the illustrated conductors are representative of parallel groups of conductors, each conveying a binary digit. It is pointed out that such storage arrangements as are illustrated in FIG. 3 are conventional. It is well-known, for example, to arrange stores in eight planes or sections so that from each section eight bits of a sixty-four bit word can be read simultaneously.

Two kinds of characters are stored in character buffer 2. The first is exemplified by the character referenced A in FIG. 3, which consists of a single character video cell stored only in one section, section 12, of the character buffer 2. We shall call character A and similar characters integrated characters. The second kind is exemplified by the character which is shown in FIG. 2 consisting of character video cells occupying areas of storage C1, C2 and C3 in storage sections 12, 13 and 14, respectively. These we shall call distributed characters. It should be noted that it is not necessary that, as indicated schematically in FIG. 3, the character video cells of a distributed character occupy corresponding storage locations in the three sections of the character buffer. For example, the store need not have different sections, and the character video cells can occupy successively addressed storage locations. Further, there need not be three character video cells to each distributed character. Two such cells may in many cases be sufficient and are all that is necessary when a display with only two primary colors is used. An example of a distributed character is shown in FIG. 2, reference C21. In the cell, two lines cross at right angles. The character is distributed between the three sections of the character buffer as follows:

Section 12 contains a character video cell with one bits which delineate the line marked C1 in FIG. 2, and zeroes elsewhere.

Section 13 contains a character video cell with one bits which delineate the line sections marked C2 in FIG. 2, and zeroes elsewhere.

Section 14 contains a character video cell with one bits which fill the areas marked C3 in FIG. 2, and zeroes elsewhere.

A distributed character provides great flexibility in the choice of colors as a color for each of the three character video cells can be individually selected. Modifications of distributed character C21 immediately suggest themselves. Section 14 can contain a one bit only at the intersection of the lines and zeroes elsewhere. The result would be that the intersection could be displayed in a color different from that of either of the lines, while the area marked C3 in FIG. 2 would be displayed in the background color of the screen. Distributed characters need not be limited to graphics. Alphanumeric characters can be shaded in different colors to give emphasis or perspective to a display.

Figure 4:
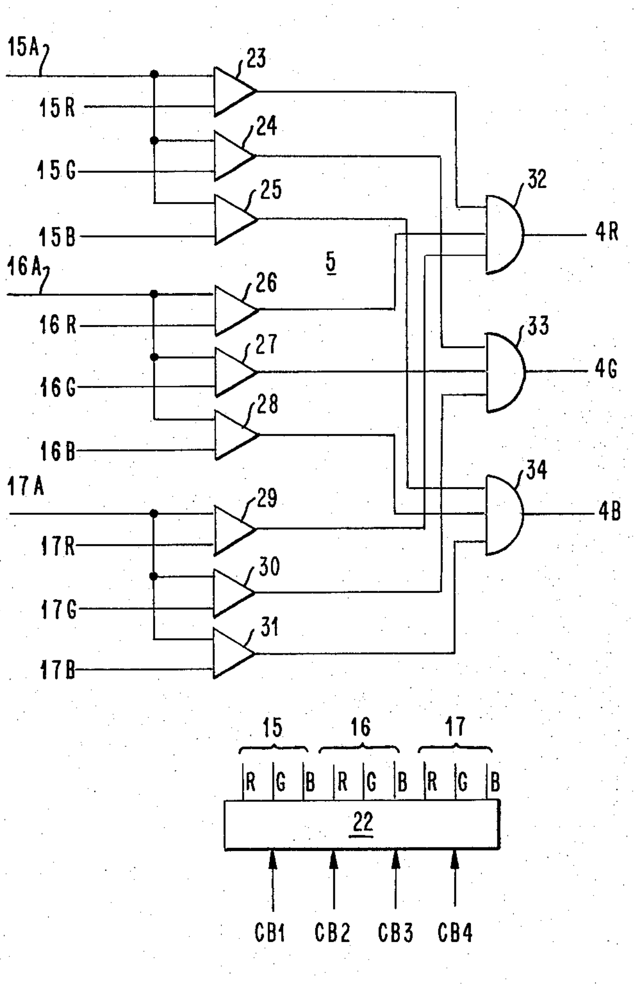
FIG. 4 is a block diagram of control equipment for use in one embodiment of the invention.

Once an integrated character or a distributed character is read from the character buffer, the choice of color is determined by directing the output of the character buffer to the appropriate color video channel or channels 4R, 4G, or 4B. This is done by control equipment 5, which as is shown in FIG. 4 is a simple switching arrangement connecting any of conductors 15A, 16A, 17A to any of the channels in accordance with information supplied from the image store.

Four color bits are associated with each character address held in image store 3, and are supplied to control equipment 5 as the associated address is supplied to the character buffer. The color bits CB1 to CB4 are decoded in the decoder 22 to provide binary output signals 15R, 15G, 15B, 16R, 16G, 16B and 17R, 17G, 17B. These signals are supplied to respective and gates 23 to 31 to which output lines 15A to 17A are also connected as shown. The and gates control the destination of the signals on lines 15A to 17A. For example, if signal 15R is a one, the signal on conductor 15A is directed by way of and gate 23 and an or gate 32 to color channel 4R. If signal 15G is a one, the signal on conductor 15A is directed by way of and gate 24 and an or gate 33 to color channel 4G. If signal 15B is one, the signal on conductor 15A is directed by way of and gate 25 and an or gate 34 to color channel 4B.

To provide secondary colors, for example, directing the signal to conductor 15A to any one or more of the color channels simultaneously, can be done by using more color bits.

In practice, however, the provision of all possible colors to each section of a distributed character is unnecessary and sufficient flexibility to display clearly most applications is provided by the following arrangement. The image cells available to the user are defined by several fonts of character cells. Certain of the fonts contain only integrated characters and occupy only one of the sections of the character buffer. The remaining fonts contain distributed characters. These fonts can also simulate integrated characters if identical character video cells are stored in each of the three sections of the character buffer. Each font is identified by a different number and each code word in the image store defining a character includes the number of the font and three color bits. If the font number refers to a font of integrated characters, the color bits are interpreted as defining one of eight colors in which the selected character cell will be displayed. If the font number refers to a font of distributed character cells, the color bits are interpreted as mask bits controlling whether the character cell portion contained in a given section of the character buffer is passed to a given color channel or channels.

Figure 5:
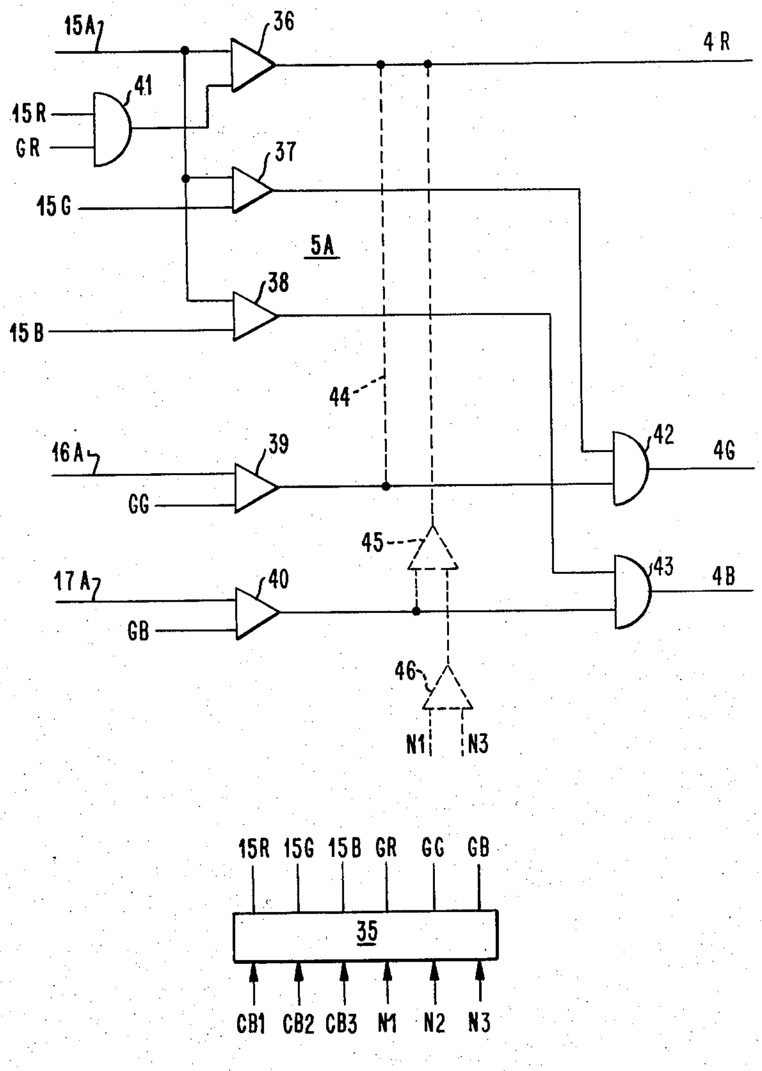
FIG. 5 is a block diagram of control equipment for use in another embodiment of a system according to the invention.

FIG. 5 shows the control equipment 5A for effecting this function.

A decoder 35 receives as input the three color bits CB1 to CB3, and three number bits N1 to N3. The code bits are interpreted according to the value of the number of bits. Suppose for example, that there are six character fonts, numbered binary 010 to binary 111 respectively, and that fonts 010 to 100 are of integrated character cells and fonts 101 to 111 are of distributed character cells. If number bits N1 to N3 represent any of the numbers 010 to 100, the color bits CB1 to CB3 are interpreted as determining the color channels 4R, 4G and 4B, to which the signals on conductor 15A are to be directed. The color bits are transformed into the signals 15R, 15G and 15B. If, on the other hand, number bits N1 to N3 represent any of the numbers 101 to 111, the color bits CB1 to CB3 are transformed into the gating signals GR, GG and GB. The circuitry for controlling the distribution of the signals on conductors 15A, 16A and 17A is shown in FIG. 5, and includes and gates 36 to 40 and or gates 41 to 43. Thus, if GR is one, the signal on conductor 15A is directed to color channel 4R, if GG is one, the signal on conductor 16A is directed to color channel 4G, and if GB is one, the signal on conductor 17A is directed to color channel 4B.

Modifications of the control equipment 5A are possible and are shown in dotted lines on FIG. 5. It is not necessary that the gate bits each direct the signals on conductors 15A, 16A and 17A to only a single channel 4R, 4G and 4B. For example, the output of and gate 39 can be connected as by line 44 to both channels 4R and 4G, resulting in the character video cell in section 16 of the character buffer being displayed in a secondary color. (The diodes necessary to ensure a one-way connection between channels 4G and 4B have been omitted from FIG. 5.) Such a connection may be conditional on the number of the font being used, as is shown by the arrangement of and gates 45 and 46. And gate 45 passes the output of and gate 40 to channel 4R only if and gate 46 is activated by number bits N1 and N3 being one, i.e., if fonts 101 or 111 are being used.

Such hardware connections are rather inflexible and it will be understood that it is preferable to achieve the same result by appropriate design of the character video cells of the distributed characters. For example, referring to image cell C21 of FIG. 2, if it is required to display the line C1 in a secondary color, all that is necessary is to store the one bits delineating line C1 in the appropriate sections of the character buffer.

Having thus described our invention, what we claim as new, and desire to secure by Letters Patent is:

1. A color character graphic display system, including a display device by means of which a colored image consisting of image cells is displayed, character buffer means arranged in operation to store a set of different characters, each consisting of more than one character video cell, image buffer means arranged in operation to store information defining the image to be displayed, a plurality of color registers each arranged in operation to store video information relating to a different primary color, and control means operative in response to information read from the image buffer means to generate the video information for an image cell by copying from the character buffer the character video cells of which a selected character consists simultaneously and selectively to the color registers.

2. A system as claimed in claim 1, wherein the character buffer means is arranged in operation also to store characters consisting of only one character video cell, and the said control means is also operative, when such a character is selected, to copy the character video cell of which the selected character consists selectively to one or more of the color registers.

3. A system as claimed in claim 2, wherein the information read from the image buffer includes a group of control signals, and the control means is such that, if the character selected consists of a single video cell, the group of control signals are interpreted as selecting color registers to which the video cell is copied, whereas, if the character selected consists of more than one video cell, the group of control signals are interpreted as determining which of the said more than one video cell are copied simultaneously to the color registers.

4. A system as claimed in claim 1, wherein the character buffer means comprises a digital store having more than one section, and addressing means arranged in operation to access each section in parallel in response to a single address, and wherein the video cells of each character consisting of more than one video cell are stored respectively in the respective store sections at storage locations accessed by the same address, which is unique to the character.

* * * * *